(12) United States Patent
Lampic et al.

(10) Patent No.: US 11,855,499 B2
(45) Date of Patent: Dec. 26, 2023

(54) VOLTAGE BALANCED WINDING PATTERN FOR AN ELECTRIC MACHINE WITH A MINIMAL NUMBER OF CONNECTIONS AND METHOD FOR ASSEMBLY OF SUCH WINDING

(71) Applicant: Elaphe Pogonske Tehnoloije D.o.o., Ljubljana (SI)

(72) Inventors: Gorazd Lampic, Ljubljana (SI); Gorazd Gotovac, Ljubljana (SI); Martin Strojnik, Domzale (SI)

(73) Assignee: Elaphe Pogonske Tehnologije D.o.o., Ljubljana (SI)

( * ) Notice: Subject to any disclaimer, the term of this patent is extended or adjusted under 35 U.S.C. 154(b) by 553 days.

(21) Appl. No.: 15/850,075

(22) Filed: Dec. 21, 2017

(65) Prior Publication Data

US 2018/0183292 A1 Jun. 28, 2018

(51) Int. Cl.
*H02K 3/28* (2006.01)
*H02K 1/16* (2006.01)
(Continued)

(52) U.S. Cl.
CPC ............... *H02K 3/28* (2013.01); *H02K 1/16* (2013.01); *H02K 3/12* (2013.01); *H02K 15/024* (2013.01);
(Continued)

(58) Field of Classification Search
CPC .......... H02K 1/16; H02K 3/12; H02K 15/024; H02K 15/085; H02K 3/50; H02K 2203/06
(Continued)

(56) References Cited

U.S. PATENT DOCUMENTS 3,324,322 A * 6/1967 Johns ................ H02K 3/28
310/198
7,061,153 B1 * 6/2006 Foshage ................ H02K 3/47
310/180
(Continued)

FOREIGN PATENT DOCUMENTS

| DE | 102012 220162 | 7/2013 | ............... H02K 3/12 |
| EP | 2608362 | 6/2013 | ............... H02K 3/28 |
| WO | WO 2012/138303 | 10/2012 | ............... H02K 3/12 |

*Primary Examiner* — Tulsidas C Patel
*Assistant Examiner* — Robert E Mates
(74) *Attorney, Agent, or Firm* — MacCord Mason PLLC

(57) ABSTRACT

A voltage balanced winding for a stator of an electric machine with a high number of pole pairs is distributed over several circumferential sections and several radial layers of the stator. The winding consists of at least two phases and each phase of the winding comprises a plurality of conductor segments, one conductor segment for each layer in each sector. Each of the conductor segments comprises a plurality of straight conductor portions arranged in an axial direction of the stator and a plurality of end-windings connecting the straight conductor portions to a wave pattern. The voltage balanced winding is characterized in that the plurality of conductor segments is divided into branches of series connected conductor segments, wherein each branch includes at least D conductor segments selected from D different sections d and D different layers j such that (j+d) mod D equals a predefined number, with D being the number of circumferential sections. At least a first conductor segment of layer j1 and sector d1 and a second conductor segment of layer j2 and sector d2 with j1+d1=j2+d2 are integrally formed as an uninterrupted conductor segment.

8 Claims, 6 Drawing Sheets

(51) Int. Cl.
*H02K 3/12* (2006.01)
*H02K 15/02* (2006.01)
*H02K 15/085* (2006.01)

(52) U.S. Cl.
CPC ....... *H02K 15/085* (2013.01); *H02K 2213/03* (2013.01)

(58) Field of Classification Search
USPC .................................. 310/207, 208
See application file for complete search history.

(56) References Cited

U.S. PATENT DOCUMENTS

| | | | |
|---|---|---|---|
| 2001/0043018 A1* | 11/2001 | Haydock | H02K 9/06 310/71 |
| 2010/0283349 A1* | 11/2010 | Wolf | H02K 15/0442 310/195 |
| 2013/0154428 A1 | 6/2013 | Sakuma et al. | |
| 2013/0187510 A1 | 7/2013 | Takiguchi et al. | |
| 2014/0125187 A1 | 5/2014 | Suzuki et al. | |
| 2014/0145540 A1* | 5/2014 | Detela | H02K 3/12 310/180 |

* cited by examiner

VOLTAGE BALANCED WINDING PATTERN FOR AN ELECTRIC MACHINE WITH A MINIMAL NUMBER OF CONNECTIONS AND METHOD FOR ASSEMBLY OF SUCH WINDING

This application claims the benefit of German National Submission Number 800536965 and Serial Number 124248954197717183089318270597971158967, filed Dec. 22, 2016, which is herein incorporated by reference in its entirety.

TECHNICAL FIELD

The present invention relates to stators of electric machines, in particular to winding patterns for a stator with a plurality of phase windings, and a corresponding manufacturing method.

BACKGROUND OF ART

Stators for electrical machines used in modern traction applications have to exhibit highly efficient conversion of electric current into magnetic flux in the air gap of the machine. The losses in the stator of an electrical machine comprise losses in the iron core and losses in the windings. In high torque motors the latter are usually dominant and thus need special attention. They are reduced by innovative winding topologies, with high fill factors and other details. One of the winding topology groups commonly used in high torque, high pole pair machines is the wave winding topology. The winding spreads in a circumferential direction over multiple slots, with end-windings positioned on each axial side. In every slot wires are uniformly arranged in radial layers, typically there is one wire within each layer. These windings ensure high efficiency and superior heat removal, but suffer from effects that are amplified by the solid cross-section of the wire and high frequencies.

The winding of an electric motor can be made up of one or more branches which are connected in parallel within one phase in order to increase the cross-section of copper for the transfer of electric current and in order to have correct level of voltage compatible with power electronics and energy storage specifications. If the before mentioned branches are not all positioned in slots in a magnetically equal way, then their inductances may differ. The main source of the differing inductances in high-pole pair machines is the slot layer position of the branch relative to the slot layer position of other branches. In traditional electric motors with pole-pair numbers below 10, this effect is not as critical, since the slot leakage is not large, due to the large slot width dimension compared to the motor magnetic stator-rotor air gap. But as the pole-pair number grows, the slot width is decreased and the slot leakage flux becomes comparable to the flux crossing the stator-rotor air gap. In this case, the issue of slot layer position of each branch is critical and it has to be addressed to prevent circular currents flowing between branches. These currents cause efficiency reduction, problems in control and over time also overheating of the winding and deterioration of the insulation.

This problem, also referred to as voltage unbalance, is even more important in wave windings, since layers in the winding are stacked one on another only in a low number of distinct layers, having substantially different inductance of distinct wires in the slot.

When eliminating voltage unbalance in wave windings, it is also very important to use as small number of uninterrupted conductor segments as possible and to strategically define the branch terminal position in order to avoid long, expensive and thermally problematic connecting wires or beams. Having a low number of connections is also a strategic advantage when reducing the stator production time and cost, and increasing the product reliability.

The voltage unbalance of parallel conductors in wave windings is solved by forming connections between the layers of the winding, in an attempt to balance the induced voltage and the resistance of the winding.

The helical type of the wave winding demands the interweaving of the winding layers in a limited way, which is aided by the connection of the correct layers together to come close to balanced parallel branches. Solutions presented in US 2014/0125187 A1, US 2013/0154428 A1 and US 2013/0187510 A1 are built on the helical winding topology to address the above problem. However, they provide only a general guideline on how to achieve a voltage balanced winding with a wave winding and do not provide a technical solution for how to achieve a voltage balanced winding with a minimum number of connections. This is a very important aspect of motor performance.

Pseudo helical winding is a type of wave winding in which neighboring conductors of the same phase lay one above each other or one below each other across its length in circumferential direction. The active parts in slots lay either above or below each other for neighboring conductors of the same phase. The winding overhangs, or also called end windings, lay either above or below each other for neighboring conductors of the same phase. The key aspect of pseudo helical winding is its non-interweaving topology. It allows inserting conductors one by one. It is not required to insert more of the conductors simultaneously. An example of the pseudo-helical winding is disclosed in US 2014/0145540 A1.

An alternative to fully non-interweaving winding is also a solution where multiple conductors are first winded in an interweaving way, but then as group of conductors they are positioned in a non-interweaving way.

Interesting winding strategy options arise that are required and allow for fully or near-fully balanced parallel branch inductances for interweaving or non-interweaving winding types.

However, also in this case the solution does not result in a reduced number of connections. Within the scope of pseudo-helical windings where the wires are not interweaved a solution for design of fully balanced parallel branches of the winding is not yet proposed.

SUMMARY

The presented innovation relates to the wave winding topology, where conductors are solid copper wires with wire diameters substantially close to the slot width. In such a case the main influence on the unbalance of induced voltages and branch resistivity is caused by the layer in the slot where the conductor is positioned. The key aspect of the invention resides in providing a design which ensures that all of the branches connected in parallel are equally represented in all of the layers with a minimum number and length of connecting wires. In addition, the branches connected in parallel are also equally represented in different circumferential sections of the motor. This is achieved by correctly identifying the length of individual uninterrupted conductor segments and their placement with regards to the circumferential position of the segment ends and their radial position (also referred to as the layer number) and the connection to the correctly chosen other uninterrupted conductor segments, as will be presented here below. Here, the term "uninterrupted conductor segment" refers to a continuous, integral piece of wire or another conductor type, such as a beam or plate or another conductor shape. The uninterrupted conductor segment has a beginning and an end, without any connection members in between. Each uninterrupted conductor segment may have at least three straight sections, which are positioned in adjacent slots belonging to the same phase. The circumferential direction of the winding is constant within one uninterrupted conductor segment.

Correctly connected and positioned uninterrupted conductor segments form a parallel branch which is fully or near-fully equivalent from the voltage balance point of view to all other branches connected in parallel and formed from other uninterrupted conductor segments positioned and connected with the same strategy.

The present innovation can also be used together with a pseudo-helical wave winding topology, as for instance disclosed in US 2014/0145540 A1. Pseudo-helical wave winding is a specific type of wave winding where each end winding of a certain uninterrupted conductor is stacked over an end winding of the neighboring uninterrupted conductor. It is done in such a way that the end windings of a first uninterrupted conductor, at a given radial layer and at a given axial side, always cross the end windings of a second, neighboring uninterrupted conductor, in the same radial layer and axial side, in a uniform manner, i.e., either always across or always below.

The winding assembly of the present invention is achieved by stacking uninterrupted conductor segments onto the stator core. The segments may be, but are not necessarily, inserted one by one, without the need of inserting multiple segments at once. In order to arrive at the envisioned voltage balanced winding, a set of rules has to be followed. In a q-phase stator, q uninterrupted conductor segments of the same length are inserted in sequence, offset by one stator slot from the previous segment in the same predetermined direction. In the following description, only the position of the first phase wires will be described, since the other q−1 phases are given by the same positioning rule. If the total number of slots is q*Ns only the Ns slots of the first phase will be counted when describing the positioning. Slots of one phase are also equally spaced around the whole circumference of the stator stack.

The present invention provides a stator with a voltage balanced winding. The stator comprises of plurality of slots arranged in a circumferential direction at predetermined intervals. The stator winding consists of at least two phases. Each phase is formed of a plurality of electric conductors. Conductors are positioned in slots of the stator core. The electric conductors are forming a wave winding. Electrical conductors are positioned in J radial layers. J is at least two. In circumferential position the electrical conductors are positioned in D circumferential sections. D is at least two. Each stator winding phase consists of VD branches electrically connected in parallel, where VD is at least two. VD can also be chosen so that J is an integer multiple of VD, including J=VD. Each branch consists of uninterrupted conductor segments connected in series. Each uninterrupted conductor segment occupies at least three adjacent slots of the same phase. At least one uninterrupted conductor segment is occupying positions of at least two different layers and two different circumferential sections.

The first embodiment of the present invention is also referred to as the basic pattern. The basic pattern for positioning the uninterrupted conductor segments into J radial layers and D circumferential sections is defined by the following rules. The typical number of uninterrupted conductor segments per phase is J+D−1. The uninterrupted conductor segments are identified by consecutive numbers. The allocation of the uninterrupted conductor segments to the various radial layers and circumferential sections is determined as follows. Let j be an integer representing the radial layer position 1 to J and d an integer representing the circumferential section position 1 to D. The circumferential sections are typically equal or similar in circumferential length. The identification number of the uninterrupted conductor segment in the j-th layer and d-th circumferential section is calculated as j+d−1. In other words, the uninterrupted conductor segments of a given phase are to be arranged on the stator such that radial layer j and circumferential section d contains the uninterrupted conductor segment with identification number j+d−1.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the disclosure will be better understood by a reading of the Description of Embodiments along with a review of the drawings, in which.

DESCRIPTION OF EMBODIMENTS

Figure 1:
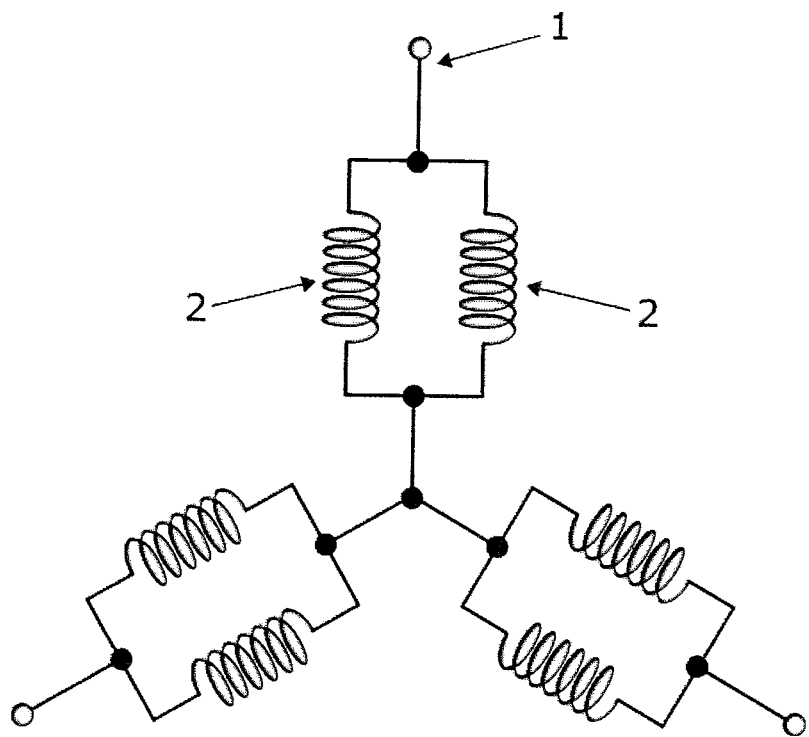
FIG. 1 is a schematic view of a three-phase winding with two parallel branches.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

FIG. 1 is a schematic representation of an electrical machine. The electrical machine has a winding that includes multiple phases. Each phase may be made up of several branches that are connected in parallel to each other. Each branch of every phase is equivalent or nearly equivalent to any of the other branches. In the non-limiting example of FIG. 1 there are three phases consisting of two branches each.

In a preferred embodiment a so-called wave winding is used, where a conductor is arranged on the lateral surface of a cylinder (i.e., the stator) with a plurality of straight conductor parts arranged in an axial direction and 180° bends, or any other shape of end windings, therebetween. A current through such a conductor will thus flow alternately in the positive axial direction and the negative axial direction.

Figure 2:
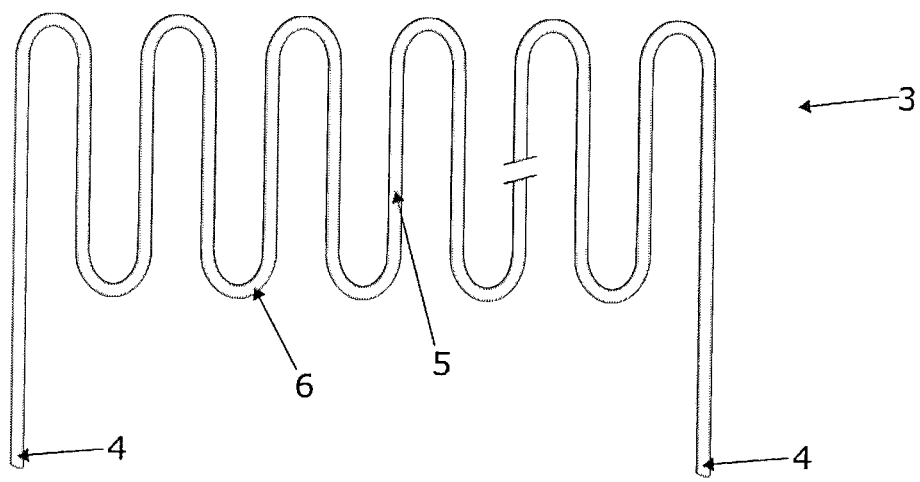
FIG. 2 shows an uninterrupted conductor segment.

Each branch of the winding is made of one or more uninterrupted conductor segments 3. An example of such an uninterrupted conductor segment is shown in FIG. 2. An uninterrupted conductor segment is a continuous (or integral) piece of conductor which has a beginning and an end 4, without any intermediate connections in between. Each uninterrupted conductor segment has a plurality of straight parts 5 and end windings 6 therebetween. The length of an uninterrupted conductor section is measured in terms of the number of straight parts. A length of each uninterrupted conductor segment is at least three straight parts.

Figure 3:
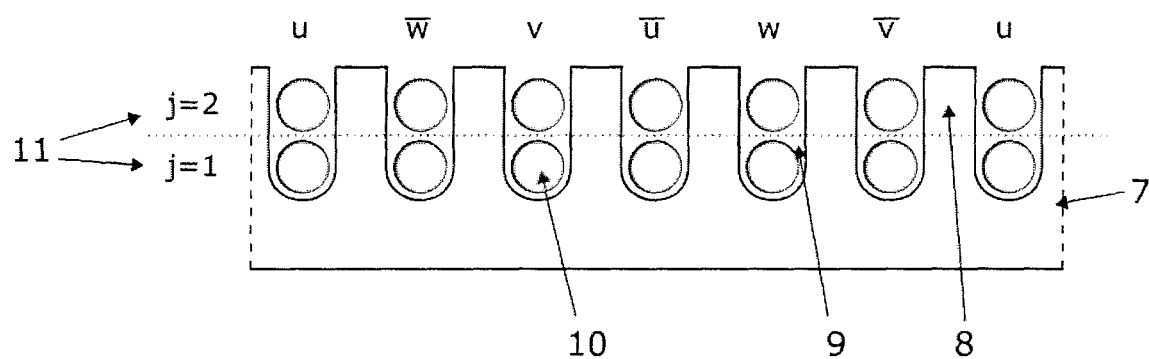
FIG. 3 is a schematic drawing of several slots with wire inserted in two radial layers, for a three phase winding.

FIG. 3 is a schematic drawing of several slots with wire inserted in two radial layers, for a three phase winding. The stator core 7 has a plurality of teeth 8 and slots 9, where the width of the wire 10 or another conductor is close to the slot width. The stator is sufficiently high so that the wire can be inserted into J radial layers 11, where J is at least 2. In FIG. 3, layers are marked with numbers j from 1 to 2. This figure shows a case with three phases marked by letters u, w, v and $\bar{u}$, $\bar{v}$, $\bar{w}$ for opposite direction.

Figure 4:
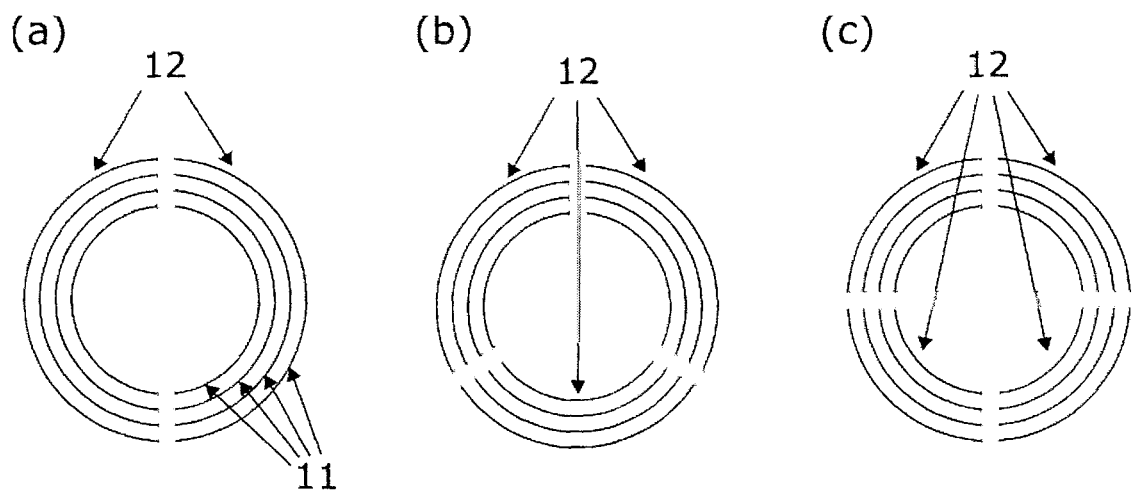
FIGS. 4a-c are schematic drawings of circumferential sections and radial layers, showing cases for 2, 3 and 4 circumferential sections, respectively, with 4 radial layers each.

In a preferred embodiment, number of stator slots is adapted such that it enables symmetry regarding the number of phases and number of branches, and also regarding number of radial layers 11, to more than one circumferential section 12, consistent with either table 1 or 6, as shown in FIGS. 4a-c.

Figure 5:
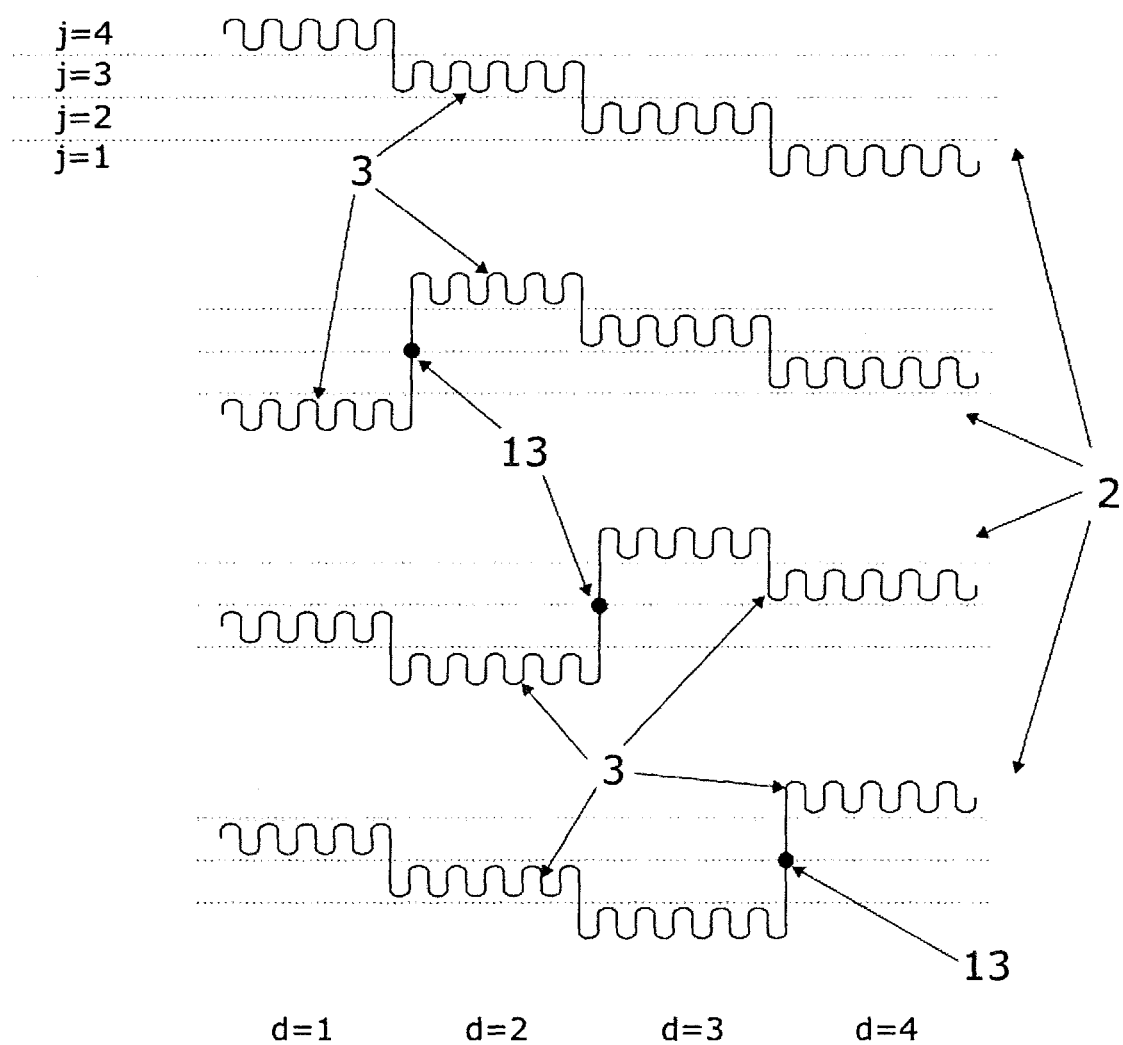
FIG. 5 is a schematic drawing of one phase consisting of four branches consisting of several uninterrupted conductor segments, in a configuration with four radial layers and four circumferential sections.
Figure 6A:
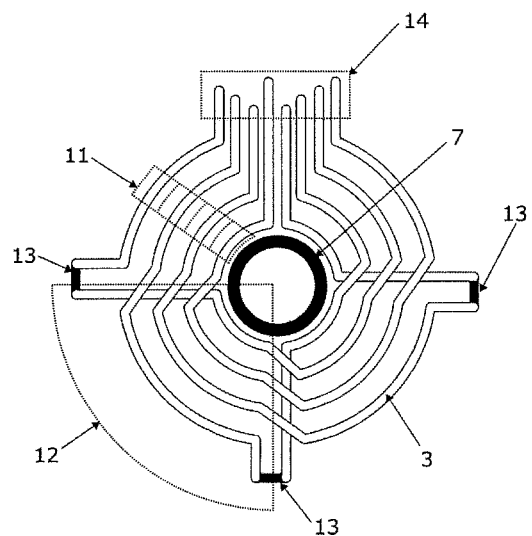
FIG. 6a is a schematic drawing of an example of a basic pattern for J=4, D=4 and VD=4 with branch terminals at one part of the motor, in accordance with an embodiment of the present invention.
Figure 6B:
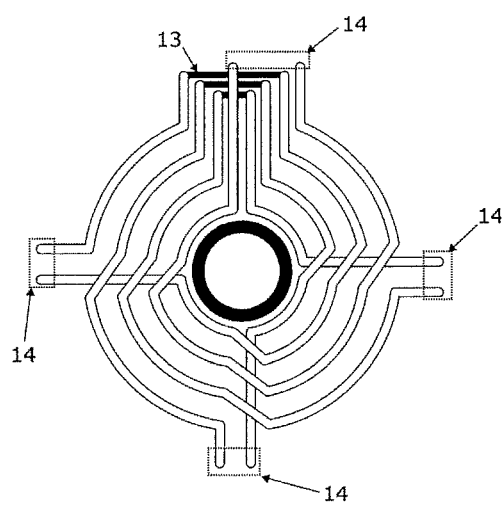
FIG. 6b is a schematic drawing of an example of a basic pattern for J=4, D=4 and VD=4 with branch terminals distributed around the motor, in accordance with an embodiment of the present invention.

FIG. 5 is a schematic drawing of one phase consisting of four branches consisting of several uninterrupted conductor segments, in a configuration with four radial layers (J=4) and four circumferential sections (D=4). FIG. 5 illustrates how the branches 2 of one phase are configured by either one or more uninterrupted conductor sections 3, such that all branches are equivalent in terms of their average radial position and also in terms of their presence around the motor in circumferential sections, and thus forming a winding without any voltage unbalance and with only a very limited number of short bridge connections 13. Branches of other phases are identical to the one shown in FIG. 5. Alternative configurations are shown in FIGS. 6-8. FIGS. 6a and 6b show two exemplary embodiments of the basic winding pattern for J=4, D=4 and VD=4. Both configurations are shown but not limited to inner stator core 7. Winding of a single phase is presented. It is composed of only few uninterrupted conductor sections 3, arranged in circumferential sections 12 and radial layers 11. Both exemplary embodiments require only three short bridge connections 13 between uninterrupted conductor sections (per phase). The embodiment of FIG. 6a has all branch terminals 14 arranged at substantially the same angular position, i.e., at a very small angle, allowing for simple and efficient short end connections. The embodiment of FIG. 6b has its branch terminals 14 evenly distributed around the stator in VD symmetry, allowing for simple separated connection to multiple inverters.

Alternative configurations are shown in FIGS. 6, 7 and 8. FIGS. 6a and 6b show two exemplary embodiments of the basic winding pattern for J=4, D=4 and VD=4. Both configurations are shown but not limited to inner stator core 7. Winding of a single phase is presented. It is composed of only few uninterrupted conductor sections 3, arranged in circumferential sections 12 and radial layers 11. Both exemplary embodiments require only three short bridge connections 13 between uninterrupted conductor sections (per phase). The embodiment of FIG. 6a has all branch terminals 14 arranged at substantially the same angular position, i.e., at a very small angle, allowing for simple and efficient short end connections. The embodiment of FIG. 6b has its branch terminals 14 evenly distributed around the stator in VD symmetry, allowing for simple separated connection to multiple inverters.

Figure 7A:
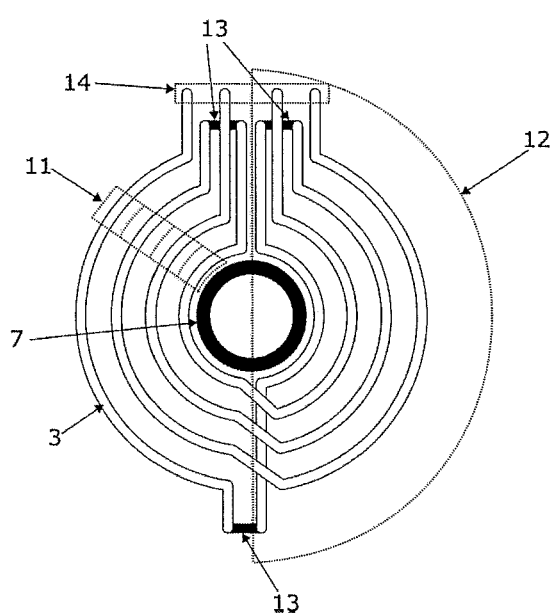
FIG. 7a is a schematic drawing of an example of a basic pattern for J=4, D=2 and VD=2 with branch terminals at one part of the motor, in accordance with an embodiment of the present invention.
Figure 7B:
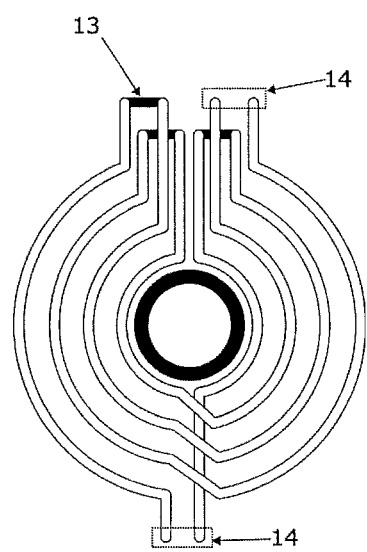
FIG. 7b is a schematic drawing of an example of a basic pattern for J=4, D=2 and VD=2 with branch terminals distributed around the motor, in accordance with an embodiment of the present invention.
Figure 8:
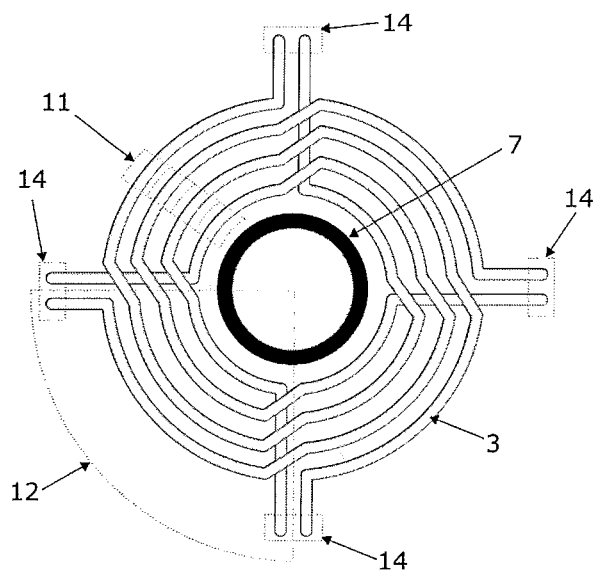
FIG. 8 is a schematic drawing of an example of the spiral pattern for J=4, D=4 and VD=4, in accordance with another embodiment of the present invention.

FIGS. 7a and 7b show two exemplary embodiments of the basic winding pattern for J=4, D=2 and VD=2. Details are similar to those of FIGS. 6a and 6b.

FIG. 8 is a schematic representation of an exemplary embodiment with a spiral winding configuration for J=4, D=4 and VD=4 for one phase. This embodiment can be implemented without any bridge connections. Each branch is made out of a single uninterrupted conductor section 3. Branch terminals 14 are distributed evenly around the circumference at the edges of circumferential sections 12. In such a configuration each branch can easily be connected to separate inverters for parallel operation.

Figure 9:
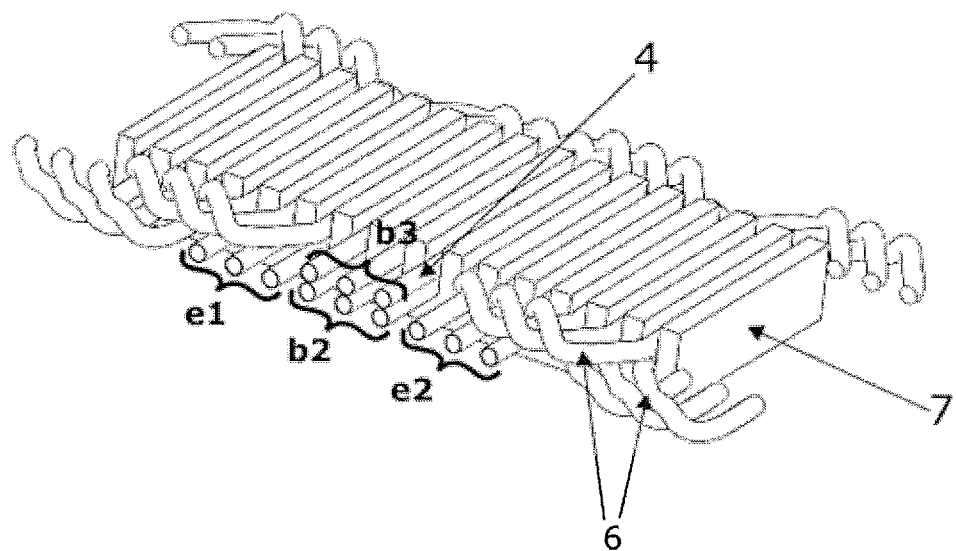
FIG. 9 shows a cutout of a 3D model indicating the branch terminal and branch terminal position for case of J=2, D=2 and VD=2, where one uninterrupted conductor segment is offset for one slot of the same phase, in accordance with an embodiment of the present invention.

FIG. 9 shows a cut out of the 3D model of a 3-phase winding with J=2, D=2, VD=2, such as described by Table 3. In this configuration, there are three uninterrupted conductor segments for each phase. Ends of uninterrupted conductor segments 4 located at a small number of slots are shown, all on the same axial side of the stator. The end of the first uninterrupted conductor segment is marked with e1, the ends of second uninterrupted conductor segment are marked with b2 and e2, and the end of the third uninterrupted conductor segment is marked with b3. In the embodiment shown in FIG. 9, a second uninterrupted conductor segment is offset by three slots (one slot per phase) to the right. E2 is offset from the first layer below b3, to the first layer next to b3 on the right. B2 is offset from the second layer above e1, to the first layer below b3. The slots in which e1 and b3 are located belong to different circumferential sections. Therefore when the second uninterrupted conductor segment is offset, b2 changes circumferential section d and therefore also changes radial layer j according to Table 3. To form a valid VD=2 connection, b2 and b3, which are in the same slot, form beginning branch terminals of two parallel branches, while e1 and e2, which are offset by two phase slots, form ending branch terminals of two parallel branches, where b3 and e1 belong to the same branch. By offsetting the ends of the second uninterrupted conductor section b2 and e2 by one slot of the same phase, the end windings 6 of the conductors of the adjacent layers in the same slots are on different axial sides of the stator, and the end windings can easily be stacked one over another. This advantage is even more pronounced when the number of radial layers is even larger. Also the stator teeth are more symmetrically enclosed by the winding. A valid VD2 connection, with same symmetry regarding axial end winding position could also be made if the second uninterrupted conductor segment was offset by any odd number of slots per phase.

Figure 10:
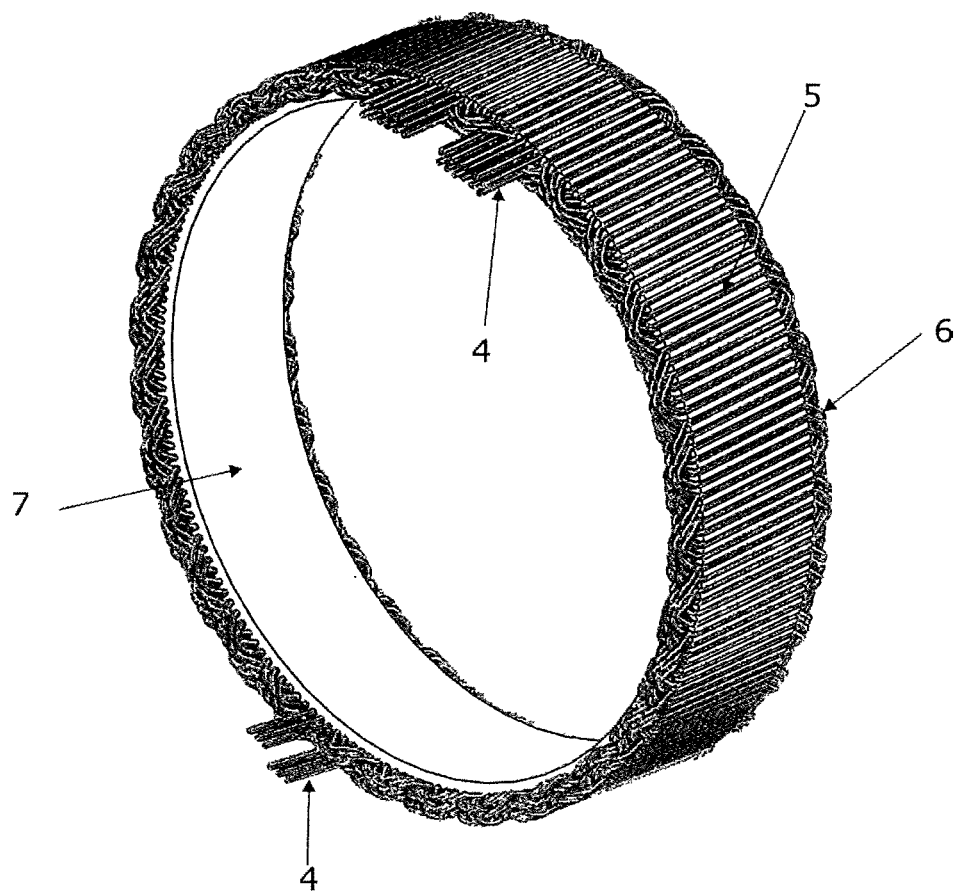
FIG. 10 shows a 3D model of an inner stator with configuration J=4, D=2 and VD=2 showing ends of uninterrupted conductor segments with ends exiting all in the same axial direction of the stator, and offset of part of uninterrupted conductor segment ends, in accordance with an embodiment of the present invention.

FIG. 10 shows a 3D model of the winding of the basic pattern with J=4, D=2 and VD=2 with three (q) phases on the inner stator core 7. The ends of uninterrupted conductor sections 4 are located in a narrow circumferential area, all in the same axial direction, to allow for short, efficient and simple branch terminal and bridge connections. In one part of the winding, where there are only two ends of uninterrupted conductor segments per phase, all the ends are within 2*q=6 slots. At the opposite side of the winding there are 8 ends of uninterrupted conductor segments per phase. While it would also be possible to have all ends within few slots, the ends of the uninterrupted conductor segments, beginning in every second layer, are offset first by one slot per phase due to end winding symmetry and by an additional offset of two slots per phase (three slots per phase in total) to get a bit more space for connections of branch terminals and bridge connections. The length of the bridge connections is not affected by this offset.

Figure 11:
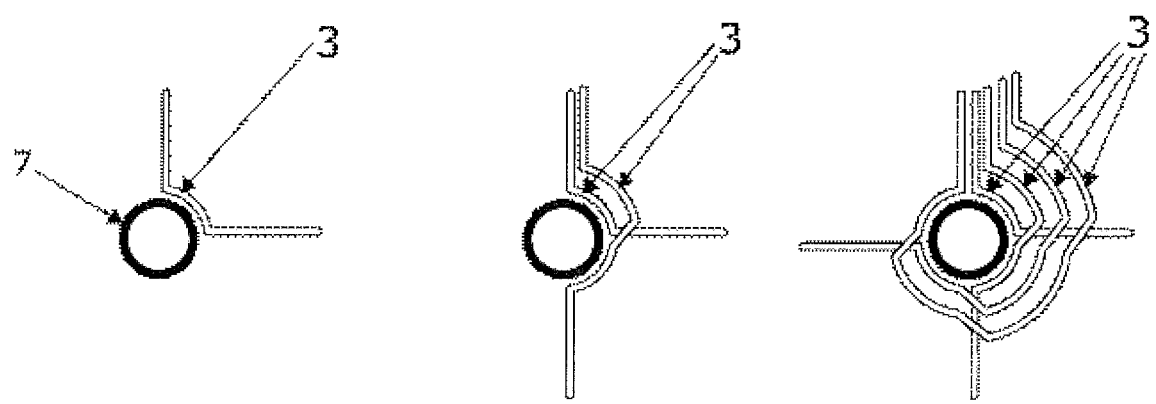
FIG. 11 illustrates steps 1, 2, and 4 in a production process for the motor based on the basic pattern, in accordance with an embodiment of the present invention.

FIG. 11 schematically shows an insertion sequence of uninterrupted conductor segments 3 for a winding based on the basic pattern with J=4, D=4. Seven segments per phase need to be inserted consecutively, in the same number of steps, for this specific embodiment, where uninterrupted conductor segments of each phase can be inserted simultaneously or consecutively within each step. In FIG. 11, steps 1, 2 and 4 are shown. First, uninterrupted conductor segments with identification number 1 are inserted for all phases, either consecutively or simultaneously. Second, uninterrupted conductor segments for all phases with the identification number 2 are inserted. Then, in the same manner, uninterrupted conduction segments with successively higher identification numbers are inserted into the stator slots.

The following clauses summarize further preferred embodiments of the present invention.

Clause 1: A voltage balanced winding for an electric machine with ten or more pole pairs, comprising an annular stator core having a plurality of slots arranged in a circumferential direction at predetermined intervals and a stator winding consisting of at least two phases each formed of a plurality of electric conductors forming a wave winding in J radial layers, where J is at least 2 and the stator winding where each phase consists of VD branches 2 electrically connected in parallel, and branches consisting of a plurality of uninterrupted conductor segments 3 that are occupying at least 3 adjacent slots of the same phase and where at least one uninterrupted conductor segment is occupying positions in at least two different radial layers 11 and in two different circumferential sections 12, and where conductors belonging to different phases are occupying adjacent slots, wherein the positions of the uninterrupted conductor segments 3 of all phases in layers and circumferential sections 12 are following the predetermined pattern of the table with the number of layer in rows from 1 to J and number of circumferential sections in columns from 1 to D and where values in the table are d+j−1, where d represent the row of the table and radial layer number and j represent the column of the table and circumferential section number and where at least the positions in the table marked with the same numbers represent the same uninterrupted conductor segment 3.

Clause 2: A voltage balanced winding for an electric machine according to Clause 1, wherein the winding type is pseudo-helical.

Clause 3: A voltage balanced winding for an electric machine according to any of the preceding Clauses, wherein electrical connections are located on one axial side.

Clause 4: A voltage balanced winding for an electrical machine according to Clause 1 and 2, wherein at least one end of at least one uninterrupted conductor segment 3 is offset in such a way that the end winding connection of two adjacent straight parts of conductors in one radial layer are located on the opposite axial sides of the stator compared to the end winding connection of two adjacent straight parts of conductors in neighbouring radial layer Clause 5: A voltage balanced winding for an electric machine according to Clause 1 and 3, in which the series connections are formed by beginnings or ends of the uninterrupted conductor segments which are an odd number of slots of the same phase apart and the parallel connections are formed by beginnings or ends of the uninterrupted conductor segments which are an even number of slots of the same phase apart or in the same slot.

Clause 6: A voltage balanced winding for an electric machine according to Clause 1 and 3, characterized in the different connections being formed by connecting the beginnings or ends of the uninterrupted conductor segments 3 at are located at circumferential positions that differ from 1 slot of the same phase to 5 slots of the same phase Clause 7: A voltage balanced winding for an electric machine according to Clause 1, wherein the predetermined circumferential position of at least the ends of uninterrupted conductor segments, forming at least one branch terminal or bridge connection of at least one branch are positioned for up to five slots of the same phase away from the position which would be derived from symmetric design.

Clause 8: A voltage balanced winding for an electric machine according to Clause 1, wherein parameters are J=4, D=4 and seven uninterrupted conductor segments per phase are occupying the following positions in terms of layers and circumferential sections {{1,1}, {2,1 and 1,2}, {3,1 and 2,2 and 1,3}, {4,1 and 3,2 and 2,3 and 1,4}, {4,2 and 3,3 and 2,4,}, {4,3 and 3,4}, {4,4}} where the first number is representing the radial layer position and the second number is representing the circumferential section.

Clause 9: A voltage balanced winding for an electric machine according to claim 1, wherein parameters are J=4, VD=2 and D=2 and having five uninterrupted conductor segments per phase occupying four radial layers and two circumferential section described with the following positions in terms of layers and circumferential sections {{1,1}, {2,1 and 1,2}, {3,1 and 2,2}, {4,1 and 3,2}, {4,2}} where the first number is representing the radial layer position and the second number is representing the circumferential section.

Clause 10: A voltage balanced winding for an electric machine with 10 or more pole pairs, comprising an annular stator core having a plurality of slots arranged in a circumferential direction at predetermined intervals and a stator winding consisting of at least two phases each formed of a plurality of electric conductors mounted on the stator core forming a wave winding in J radial layers, where J is at least 2 and the stator winding where each phase consists of VD branches 2 electrically connected in parallel, and branches consisting of a plurality of uninterrupted conductor segments 3 that are occupying at least 3 adjacent slots of the same phase and where at least one uninterrupted conductor segment is occupying at least two different radial layers and two different circumferential sections, and where conductors belonging to different phases are occupying adjacent slots, wherein the positions of the uninterrupted conductor segments of all phases in radial layers and circumferential sections are following the pattern of the table with the number of layer in rows from 1 to J and number of circumferential sections in columns from 1 to D and where values $d-j+1$ in all cells in case $d \geq j$ or $d-j+1+J$ in case $d<j$, where d represent the row (layer) number and j represent the column (circumferential section) number and where at least the positions marked with the same numbers represent the same uninterrupted conductor segment.

Clause 11: A voltage balanced winding for an electric machine according to Clause 10, wherein the winding type is pseudohelical.

Clause 12: A voltage balanced winding for an electric machine according to Clause 1, where all branch terminal connections are positioned in a small circumferential region of the winding, within minimum of 2q adjacent slots, where q is number of phases.

Clause 13: A voltage balanced winding for an electric machine according to Clause 1, where branch terminal connections are distributed uniformly in VD periods around the machine, where VD is a number of parallel branches of each phase.

Clause 14: A method of production of a stator of a rotating electric machine with 10 or more pole pairs, comprising an annular stator core having a plurality of slots arranged in a circumferential direction at predetermined intervals and a stator winding consisting of at least two phases each formed of a plurality of electric conductors forming a wave winding in J radial layers 11, where J is at least 2 and the stator winding where each phase consists of VD branches 2 electrically connected in parallel, and branches consisting of a plurality of uninterrupted conductor segments 3 that are occupying at least 3 adjacent slots of the same phase and where at least one uninterrupted conductor segment is occupying positions in at least two different radial layers and in two different circumferential sections 12, and where conductors belonging to different phases are occupying adjacent slots, wherein the positions of the uninterrupted conductor segments of all phases in radial layers and circumferential sections are following the predetermined pattern of the table with the number of layer in rows from 1 to J and number of circumferential sections in columns from 1 to D and where values in the table are $d+j-1$ in all cells, where d represent the row of the table and radial layer number and j represent the column of the table and circumferential section number and where at least the positions in the table marked with the same numbers represent the same uninterrupted conductor segment, wherein the uninterrupted conductor sections are produced outside of the stator and are inserted into the stator core Clause 15: A method of production of a stator of a rotating electric machine with 10 or more pole pairs according to Clause 14 characterized in a procedure where uninterrupted conductors are inserted in consecutive steps according to the uninterrupted conductor segment identification number, from lower to higher identification number, where the uninterrupted conductor segments of all phases can be inserted either consecutively or simultaneously, within each step.

Clause 16: A method of production of a stator of a rotating electrical machine according to Clause 14, wherein parameters are J=4 and D=4 and seven uninterrupted conductor segments per phase are occupying the following positions in terms of radial layers and circumferential sections: 1{1,1}, 2{2,1 and 1,2}, 3{3,1 and 2,2 and 1,3}, 4{4,1 and 3,2 and 2,3 and 1,4}, 5{4,2 and 3,3 and 2,4,}, 6{4,3 and 3,4} and 7{4,4}, where each pair of numbers in the bracket represents the radial layer position with first number and the circumferential section with the second number, for each uninterrupted conductor segment.

Clause 17: A method of production of a stator of a rotating electrical machine according to Clause 16, wherein parameters are J=4, D=2 and VD=2 and five uninterrupted conductor segments per phase are occupying the following positions in terms of radial and circumferential sections: 1{1,1}, 2{2,1 and 1,2}, 3{3,1 and 2,2}, 4{4,1 and 3,2} and 5{4,2}, where each pair of numbers in the bracket represents the radial layer position with first number and the circumferential section with the second number, for each uninterrupted conductor segment.

Clause 18: A method of production of a stator of a rotating electric machine with 10 or more pole pairs, comprising an annular stator core having a plurality of slots arranged in a circumferential direction at predetermined intervals and a stator winding consisting of at least two phases each formed of a plurality of electric conductors mounted on the stator core forming a wave winding in J radial layers, where J is at least 2 and the stator winding where each phase consists of VD branches 2 electrically connected in parallel, and branches consisting of a plurality of uninterrupted conductor segments 3 that are occupying at least 3 adjacent slots of the same phase and where at least one uninterrupted conductor segment is occupying at least two different radial layers and two different circumferential sections 12, and where conductors belonging to different phases are occupying adjacent slots, wherein the positions of the uninterrupted conductor segments of all phases in radial layers and circumferential sections are following the pattern of the table with the number of layer in rows from 1 to J and number of circumferential sections in columns from 1 to D and where values $d-j+1$ in all cells in case $d \geq j$ or $d-j+1+J$ in case $d<j$, where d represent the row (layer) number and j represent the column (circumferential section) number and where at least the positions marked with the same numbers represent the same uninterrupted conductor segment, wherein the uninterrupted conductor sections are produced outside of the stator and are all inserted at the same time into the stator core.

The following tables demonstrate the efficacy and utility of the present inventions.

TABLES

If we draw a table showing positions of all uninterrupted conductor segments by their identification numbers in different radial layers j and different circumferential sections d, then the identification number is j+d−1, as shown in Table 1. This pattern is the same for all phases. The uninterrupted conductor segments of different phases are similar in terms of length and position in radial layers and circumferential positions.

Cells from Table 1 that are marked with the same number consist of the same uninterrupted conductor segment. Such uninterrupted conductor segment can pass through different circumferential sections that are named with d and different radial layers that are named with j. Hence, uninterrupted conductor segment with different identification numbers may have to have different lengths in order to comply with their allocation to potentially different numbers of circumferential sectors.

TABLE 1

Uninterrupted conductor segment identification number with respect to the radial layer j and circumferential section d

|       | d = 1   | d = 2   | d = 3   | d . . . |
|-------|---------|---------|---------|---------|
| j = 1 | j + d − 1 | j + d − 1 | j + d − 1 | . . . |
| j = 2 | j + d − 1 | j + d − 1 | j + d − 1 | . . . |
| j = 3 | j + d − 1 | j + d − 1 | j + d − 1 | . . . |
| j . . . | . . . | . . . | . . . | . . . |

The table is not necessarily square, i.e., dimensions are not limited to equal numbers of rows and columns, as it will be explained here below. The size can be any integer larger than 1, but most practical sizes are up to 10 columns and or rows. The number of slots where a single uninterrupted conductor segment is placed can also be calculated for the pattern above by counting the appearance of the uninterrupted conductor segment identification number in the table and multiplying it by the number of straight parts in each circumferential section d. The lengths of the uninterrupted conductors segments are measured in number of straight parts. This method can be used to check the equal length of all branches. It can also be used to prepare uninterrupted conductor segments to appropriate length prior to the insertion into the stator core. In the case of four radial layers J and four circumferential sections D, the positions of uninterrupted conductor segments are presented in Table 2.

TABLE 2

Uninterrupted conductor segment identification number with respect to the radial layer j and circumferential position d for J = 4 and D = 4

|       | d = 1 | d = 2 | d = 3 | d = 4 |
|-------|-------|-------|-------|-------|
| j = 1 | 1 | 2 | 3 | 4 |
| j = 2 | 2 | 3 | 4 | 5 |
| j = 3 | 3 | 4 | 5 | 6 |
| j = 4 | 4 | 5 | 6 | 7 |

Table 2 is showing an embodiment where there are seven uninterrupted conductor segments in the winding for each phase. The first uninterrupted conductor segment occupies the position at circumferential section 1 and radial layer 1. The second uninterrupted conductor segment occupies the position at circumferential section 1 and radial layer 2 and also the circumferential section 2 and radial layer 1. This second uninterrupted conductor segment is approximately twice as long as the first uninterrupted conductor segment. The third uninterrupted conductor segment is occupying positions at circumferential sections 1 and radial layer 3, circumferential section 2 and radial layer 2, and circumferential section 3 and radial layer 1. This one is approximately three times as long as the first uninterrupted conductor segment. The lengths and positions of the remaining four uninterrupted conductor segment are then defined in a similar way, as it is presented in the text and table above.

In this specific case, the length of the circumferential sections is approximately one quarter of the motor circumference.

The pattern with consecutive uninterrupted conductor segment defined as j+d−1 in each of the radial and circumferential positions j and d can be used in several different embodiments if this is possible at the specific combinations of J, D and VD parameters. The situation in Table 2, for example, was derived for four radial layers and four circumferential sections which is the case of the winding that requires four parallel branches per phase. This is achieved by connecting in series uninterrupted conductor segments with the following segment identification numbers 1 and 5, segments 2 and 6 and segments 3 and 7. Segment 4 is equivalent by itself to other branches. However, for the winding where only two branches per phase are connected in parallel the simplest winding pattern can have two circumferential sections and two layers. Table 3 shows the positions of three uninterrupted conductor segments, where segments with segment identification numbers 1 and 3 in series form the first branch and segment 2 forms the second branch.

TABLE 3

Uninterrupted conductor segment identification number with respect to the radial layer j and circumferential position d for J = 2 and D = 2

|       | d = 1 | d = 2 |
|-------|-------|-------|
| j = 1 | 1 | 2 |
| j = 2 | 2 | 3 |

If it is desired to have two parallel branches with four radial layers, the simplest way to do so might seem by using a two layer pattern such as in table 3 and adding two radial layers in the same manner as is used in the first two radial layers, just to give the additional uninterrupted conductors sequential numbers 4, 5 and 6, as shown in table 4.

TABLE 4

Uninterrupted conductor segment identification number with respect to radial layer j and circumferential position d when adding two additional layers j = 3 and 4, so that J = 4, and D = 2.

|       | d = 1 | d = 2 |
|-------|-------|-------|
| j = 1 | 1 | 2 |
| j = 2 | 2 | 3 |
| j = 3 | 4 | 5 |
| j = 4 | 5 | 6 |

However, the number of uninterrupted conductor segments in the case shown in Table 4 is six, which is one more than proposed by the initial equation J+D−1=5. This is due to the fact that there can be an additional simplification to the pattern. Uninterrupted conductor segments 3 and 4 of Table 4 can actually be made from a single uninterrupted conductor segment.

If the procedure in the table 1 is followed, the resulting pattern is shown in table 5, where again the same number represents the same uninterrupted conductor segment with J+D−1=5 segments. The two equivalent branches can be formed by connecting segments with segment identification numbers 1, 3 and 5, and segments 2 and 4.

TABLE 5

Uninterrupted conductor segment identification number with respect to the radial layer j and circumferential position d for J = 4 and D = 2

| j and d | d = 1 | d = 2 |
|---|---|---|
| j = 1 | 1 | 2 |
| j = 2 | 2 | 3 |
| j = 3 | 3 | 4 |
| j = 4 | 4 | 5 |

While the winding pattern as defined by Table 5 has the least uninterrupted conductor segments for a particular case of J=4 and D=2, sometimes it can be beneficial to have an additional uninterrupted conductor sections as shown, for instance, in Table 4. Such a case could be for instance if the length of single uninterrupted conductor segment would become too long for purposes of handling, or if the symmetry of the winding would need to change, or if some additional branch terminals were needed at some specific location. One of the possibilities for making the different patterns of winding is the possibility to always start with the initial basic pattern for giving the uninterrupted conductor segment number as j+d−1 in the arbitrary table for any combinations of J and D, each greater than 1, but then to break any of the uninterrupted conductor segments of this pattern into several shorter uninterrupted conductor segments.

Further versions of the exemplary embodiment are applicable to at least all of the above described versions and the description of the exemplary embodiments here below. In one embodiment, the uninterrupted conductor segments are positioned in such a way that the uninterrupted conductor segments of adjacent layers have an offset of an odd number of slots of the same phase.

An advantage of such layout is that the distribution of the end windings is more even, so it is easier to position them and make the winding more compact. A single end winding (generally U-shaped bend) connects two straight sections of the uninterrupted conductor segment. If there is an offset of an odd number of slots of the same phase between conductors in the adjacent layers, the end windings of the adjacent layers, connecting two straight sections in the same slots, will be positioned axially at opposite sides of the rotor. Another advantage of such an offset is that the stator teeth are more evenly surrounded by the conductor, making the winding even more electrically balanced. One of the advantages of using the present invention is also flexibility with regard to the position of connections.

In one embodiment, all branch terminals may be positioned within 2q adjacent slots, where q is number of phases, by positioning at least one end of every uninterrupted conductor segment, depending on the pattern table, within the desired 2q slots. This enables short terminal connections and bridge connections, and consequentially low amount of connection heating, without using large and expensive connection beams. In this case a very compact centralized connection terminal assembly can be used.

The winding pattern according to the innovation is especially useful in case of a high number of pole pairs, e.g. ten pole pairs or more, and a small slot and tooth width. In such a situation, the space at the branch terminals is limited and it can be difficult to produce end connections. To gain more space for the end connections, the ends of the uninterrupted conductor segments of every second radial layer in a selected (typically the first) circumferential section may be offset by a number of slots of the same phase. The ends of the uninterrupted conductor segments in the adjacent circumferential section, which belong to the corresponding branches, are also offset by the same number of slots.

In a preferred embodiment of the present invention, all ends of all uninterrupted conductor segments are positioned in one axial direction of the stator core. In this embodiment the series connections between uninterrupted conductor segments are always formed by ends of the uninterrupted conductor segments apart by an odd number of slots of the same phase and the parallel connections of branch terminals are formed by ends of the uninterrupted conductor segments either in the same slot or apart by an even number of slots of the same phase.

In some machines, either due to very large power, due to safety, reliability or any other reason, it can be advantageous to use several inverters in parallel with one machine. In a preferred embodiment, branch terminals are positioned uniformly around the circumference of the machine with maximum separation of 360/VD degrees, where VD is the number of parallel connections, and preferably at the border of the circumferential sections. This enables easy access for distributed inverter use on a single motor with short length of the connections between the sub-windings.

According to a second embodiment of the present invention, all uninterrupted conductor segments that are connected in parallel begin at the same radial layer but at different circumferential positions. The simplest presentation of this winding pattern is a spiral winding pattern where the number of radial layers is equal to the number of circumferential sections and the number of parallel branches. Table 6 shows the position of four different uninterrupted conductor segments for four radial layers and four circumferential sections.

TABLE 6

Uninterrupted conductor segment identification number with respect to the radial layer j and circumferential position d for J = 4 and D = 4 in the spiral winding scheme

| Circumferential section Radial layer | d = 1 | d = 2 | d = 3 | d = 4 |
|---|---|---|---|---|
| j = 1 | 3 | 4 | 1 | 2 |
| j = 2 | 4 | 1 | 2 | 3 |
| j = 3 | 1 | 2 | 3 | 4 |
| j = 4 | 2 | 3 | 4 | 1 |

The way of calculating the number in each of the cells in Table 6, showing the positions of the uninterrupted conductor segments in layers j and circumferential sections d is the following. j is the number of radial layer in rows from 1 to J and d is the number of circumferential section in columns from 1 to D. The values in the j-th row and d-th column is ((d+j) mod D)+1.

The positions marked with the same numbers represent the same uninterrupted conductor segment. These are the conductors of one phase. The position of conductors of other phases are defined in a similar way, the conductors are just positioned adjacent to each other in the circumferential direction.

The present invention also provides a method for assembling a winding according to the above embodiments. Uninterrupted conductor segments may be prefabricated, e.g., cut to appropriate length and bend into shape, and then inserted into the stator slots. In case of assembling a winding according to the first embodiment, i.e., a winding with the basic pattern, the order in which uninterrupted conductor segments have to be inserted into the slots is determined by the numbers in Table 1, i.e., by the identifiers of the uninterrupted conductor segments. Uninterrupted conductor segments may be inserted consecutively with separate uninterrupted conductor segments for each phase, consecutively by increasing identification number of the uninterrupted conductor segment. In other words, uninterrupted conductor segments of all phases with the same identification number are inserted one after the other, before uninterrupted conductor segments with the next identification number will be inserted. According to another option, uninterrupted conductor segments of all phases with the same identification number are inserted at the same time, before uninterrupted conductor segments with the next identification number will be inserted.

In case of assembling a winding according to the second embodiment, i.e., a winding with the spiral pattern, all uninterrupted conductor segments may be inserted into the stator core at the same time.

According to a first aspect of the present invention, a voltage balanced winding for a stator of an electric machine is provided. The stator comprises a plurality of slots arranged in a circumferential direction of the stator in predetermined intervals. The winding is distributed over D circumferential sections in a circumferential direction of the stator, D being an integer greater than 1, and J radial layers in a radial direction of the stator, J being an integer greater than or equal to D. The winding consists of at least two phases and each phase of the winding comprises a plurality of conductor segments, one conductor segment for each layer in each sector, each of said conductor segments comprising a plurality of straight conductor portions arranged in an axial direction of the stator and a plurality of end-windings connecting the straight conductor portions to a wave pattern. Each straight conductor segment is accommodated in one slot. The winding is characterized in that the plurality of conductor segments is divided into branches of series connected conductor segments, wherein each branch includes at least D conductor segments selected from D different sections d and D different layers j such that (j+d) mod D equals a predefined number. At least a first conductor segment of layer j1 and sector d1 and a second conductor segment of layer j2 and sector d2 with j1+d1=j2+d2 are integrally formed as an uninterrupted conductor segment.

In this manner, the number of individual conductor segments and therewith the number of external connections can be reduced.

This advantage can be further maximized if all conductor segments selected from layers j and sections d such that the sum of j and d equals a predefined number, are integrally formed as an uninterrupted conductor segment, or if all series connected conductor segments are integrally formed as an uninterrupted conductor segment.

Preferably, electrical connections of all conductor segments are arranged on one axial side of the stator.

Preferably, the conductor segments are arranged in the slots such that a first end-winding connecting two straight conductor portions in a first radial layer of a pair of slots and a second end-winding connecting another two straight conductor portions in a second radial layer adjacent to the first radial layer of the same pair of slots are arranged on opposite axial sides of the stator.

Preferably, a first conductor segment of a branch and a second conductor segment of the same branch are connected in series by electrically connecting an end of the first conductor segment and an end of the second conductor segment, said end of the first conductor segment and said end of the second conductor segment being located in neighboring slots accommodating straight conductor portions of the same phase, or being separated by an even number of slots accommodating straight conductor portions of the same phase.

Preferably, a third conductor segment of a first branch and a fourth conductor segment of a second branch other than the first branch are connected in parallel by electrically connecting an end of the third conductor segment and an end of the fourth conductor segment, said end of the third conductor segment and said end of the fourth conductor segment being separated by an odd number of slots accommodating straight conductor portions of the same phase or located within the same slot.

Preferably, all ends of all branches are arranged proximate to each other within 2q adjacent slots or more, where q is the number of phases, and most preferably within not more than 5q adjacent slots. Alternatively, all ends of all branches may also be distributed uniformly in VD periods around the stator, where VD is a number of parallel branches of each phase.

In a particularly preferred embodiment, a type of the winding is a pseudo-helical winding type.

According to another aspect of the present invention, a method for manufacturing the voltage balanced winding is provided. The method is characterized by dividing the plurality of conductor segments into branches, wherein each branch includes at least D conductor segments selected from D different sections d and D different layers j such that (j+d) mod D equals a predefined number; integrally forming at least a first conductor segment of layer j1 and sector d1 and a second conductor segment of layer j2 and sector d2 with j1+d1=j2+d2 as an uninterrupted conductor segment; and connecting the conductor segments of each branch in series.

In a preferred embodiment, the method further comprises the steps of prefabricating the plurality of uninterrupted conductor segments and inserting the prefabricated conductor segments into the slots.

In doing so, the order in which the uninterrupted conductor segments have to be inserted into the slots may be determined by an identification number which is the sum of the layer index j and the section index d of the respective conductor segment. Further, uninterrupted conductor segments of all phases with the same identification number may be inserted one after the other, before uninterrupted conductor segments with the next identification number will be inserted. Alternatively, uninterrupted conductor segments of all phases with the same identification number are inserted at the same time, before uninterrupted conductor segments with the next identification number will be inserted.

Hence, voltage balanced windings for a stator of an electrical machine can be manufactured in a highly efficient manner.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size, and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

We claim:

1. A voltage balanced winding for a stator of an electric machine with a high number of pole pairs, said stator having a plurality of slots arranged in a circumferential direction of the stator in predetermined intervals, said winding being a pseudo-helical winding having a non-interweaving topology adapted to allow inserted conductors one by one, and having a wave winding distributed over D circumferential sectors in a circumferential direction of the stator and a winding distributed over J radial layers in the radial direction of the stator, wherein D being an integer greater than 1, and J radial layers in a radial direction of the stator, J consisting of an integer greater than or equal to D, wherein said winding consisting essentially of at least two phases having a plurality of conductor segments, one conductor segment for each layer in each sector, and each of said conductor segments consisting essentially of a plurality of straight conductor portions arranged in an axial direction of the stator and a plurality of end-windings connecting the straight conductor portions to a wave pattern having multiple end windings of the mode, each straight conductor portion being accommodated in one slot, wherein the plurality of conductor segments is divided into connected branches of conductor segments in series, wherein each connected branch includes at least D conductor segments selected from D different sectors d and D different layers j such that (j+d) mod D equals a predefined number, and wherein a series of at least a first conductor segment of layer j1 and sector d1 and a second conductor segment of layer j2 and sector d2 with j1+d1=j2+d2 are integrally formed as a prefabricated uninterrupted conductor segment, and wherein said conductor segments inserted into the plurality of slots arranged in the circumferential direction of the stator in the intervals to accommodate the straight conductor portions, and thereby define a pseudo-helical winding having a fully balanced plurality of parallel winding branches.

2. The voltage balanced winding of claim 1, wherein a sum of conductor segments from layer j and sector d equals a predefined number and being integrally formed as an uninterrupted conductor segment.

3. The voltage balanced winding of claim 1, wherein the electrical connections of the end-windings being arranged on one axial side of the stator.

4. The voltage balanced winding of claim 1, wherein the conductor segments being arranged in the slots such that a first end-winding connecting two straight conductor portions in a first radial layer of a pair of slots and a second end-winding connecting another two straight conductor portions in a second radial layer adjacent to the first radial layer of the same pair of slots are arranged on opposite axial sides of the stator.

5. The voltage balanced winding of claim 1, wherein a first conductor branch segment and a second conductor branch segment are connected in series by electrically connecting an end of the first conductor branch segment and an end of the second conductor branch segment, said end of the first conductor branch segment and said end of the second conductor branch segment being located in neighboring slots accommodating straight conductor portions of a same phase, or being separated by an even number of slots accommodating straight conductor portions of the same phase.

6. The voltage balanced winding of claim 5, including a third conductor branch segment and a fourth conductor branch segment distinct from the first conductor branch segment are connected in parallel by electrically connecting an end of the third conductor branch segment and an end of the fourth conductor branch segment, said end of the third conductor branch segment and said end of the fourth conductor branch segment being separated by an odd number of slots accommodating straight conductor portions of the same phase or located within the same slot.

7. The voltage balanced winding of claim 1, wherein ends of the connected branches are arranged proximate to each other within 2q adjacent slots or more, where q is a number of phases.

8. The voltage balanced winding of claim 1, wherein ends of the connected branches are distributed uniformly in a VD period around the stator, where VD is a number of parallel connected branches of each phase.

* * * * *